(12) United States Patent
Shukla

(10) Patent No.: US 11,129,142 B1
(45) Date of Patent: Sep. 21, 2021

(54) SIMULTANEOUS MESH AND ACCESS POINT OPERATION MODES OF A RADIO

(71) Applicant: Amazon Technologies, Inc., Seattle, WA (US)

(72) Inventor: Ashish Kumar Shukla, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 188 days.

(21) Appl. No.: 16/427,067

(22) Filed: May 30, 2019

(51) Int. Cl.
*H04W 72/04* (2009.01)
*H04W 40/24* (2009.01)
*H04W 88/10* (2009.01)
*H04W 84/12* (2009.01)

(52) U.S. Cl.
CPC ..... *H04W 72/0406* (2013.01); *H04W 40/244* (2013.01); *H04W 72/0446* (2013.01); *H04W 84/12* (2013.01); *H04W 88/10* (2013.01)

(58) Field of Classification Search
CPC ......... H04W 72/0406; H04W 72/0446; H04W 40/244; H04W 84/12; H04W 88/10
See application file for complete search history.

(56) References Cited

U.S. PATENT DOCUMENTS

| | | | | |
|---|---|---|---|---|
| 2006/0205408 A1* | 9/2006 | Nakagawa | ............ | H04W 88/02 455/445 |
| 2006/0262753 A1* | 11/2006 | Cho | ........................ | H04W 8/26 370/331 |
| 2008/0130596 A1* | 6/2008 | Kalhan | ................. | H04W 88/10 370/338 |
| 2010/0067506 A1* | 3/2010 | Denteneer | ........... | H04W 74/004 370/338 |
| 2010/0232400 A1* | 9/2010 | Patil | ...................... | H04W 88/10 370/337 |
| 2012/0106522 A1* | 5/2012 | Reumerman | ......... | H04W 48/08 370/337 |
| 2018/0331914 A1* | 11/2018 | Yoshida | ................... | H04W 4/80 |
| 2019/0029068 A1* | 1/2019 | Sturek | ..................... | H04L 61/20 |

OTHER PUBLICATIONS

IEEE 802.11-2016 Section 9.2.4.1.4 to DS and From DS subfields, Date of Publication: Dec. 14, 2016.

* cited by examiner

*Primary Examiner* — Rina C Pancholi
(74) *Attorney, Agent, or Firm* — Lowenstein Sandler LLP

(57) ABSTRACT

Technologies directed to allow a wireless network device with a single wireless local area network (WLAN) radio to act as a mesh station (Mesh STA) and also an access point (AP) are described. A processor sends data in a specified mode, via a radio, to identify itself as a mesh station in the mesh network and an AP in an access network. The processor receives a first frame via the radio and determines that the first frame is directed to the mesh station and receives a second frame via the radio and determines that the second frame is directed to the AP. The processor processes the first frame as a mesh frame using first processing logic and processes the second frame as an AP frame using second processing logic.

20 Claims, 7 Drawing Sheets

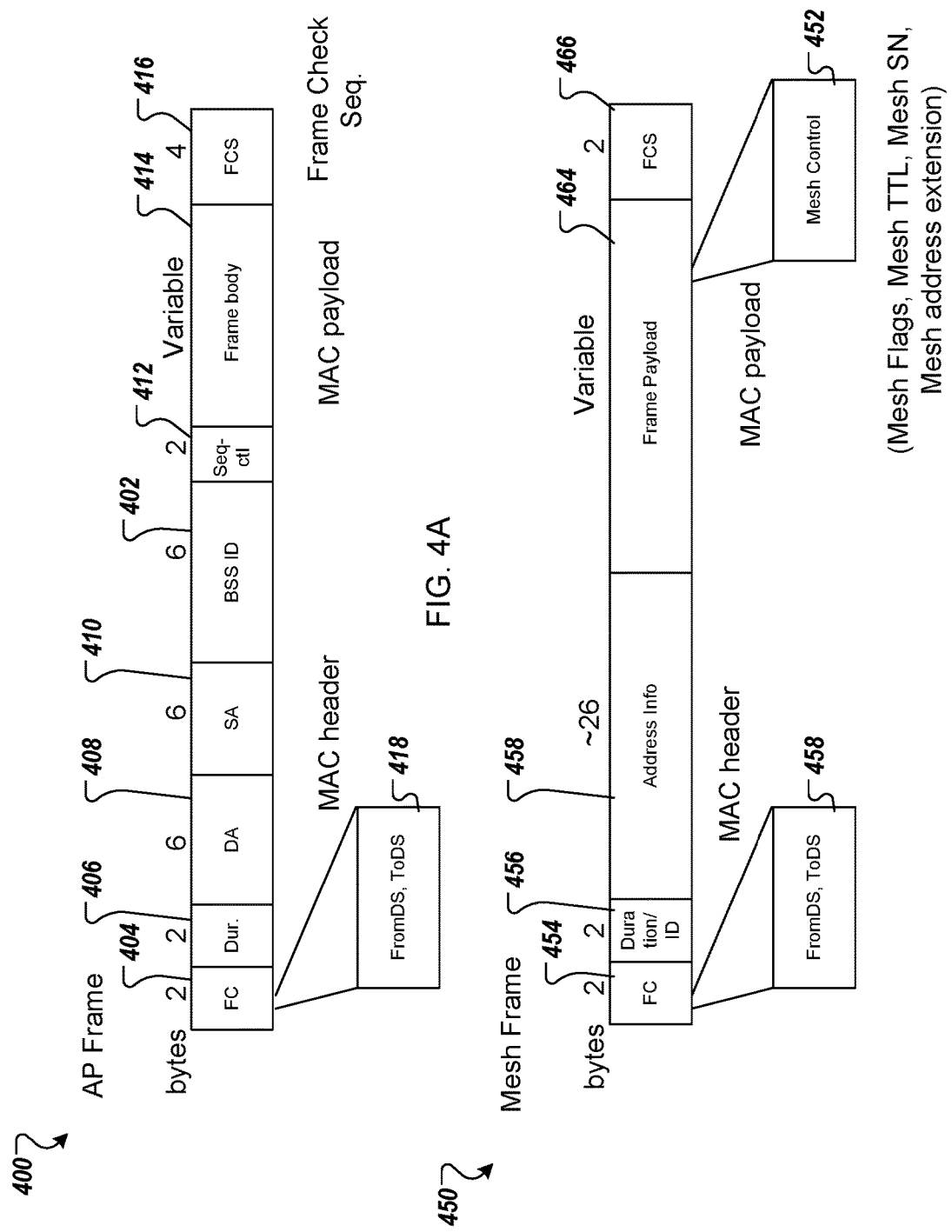

SIMULTANEOUS MESH AND ACCESS POINT OPERATION MODES OF A RADIO

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

A wireless mesh network may support establishing point-to-point wireless links between the participating communication devices. A network device may utilize the wireless mesh network for accessing digital content stored on one or more digital content servers within or outside of the mesh network.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 4A is an example of an AP frame with a frame control field according to one embodiment.

FIG. 4B is an example of a mesh frame with a frame control field according to one embodiment.

DETAILED DESCRIPTION

Figure 1:
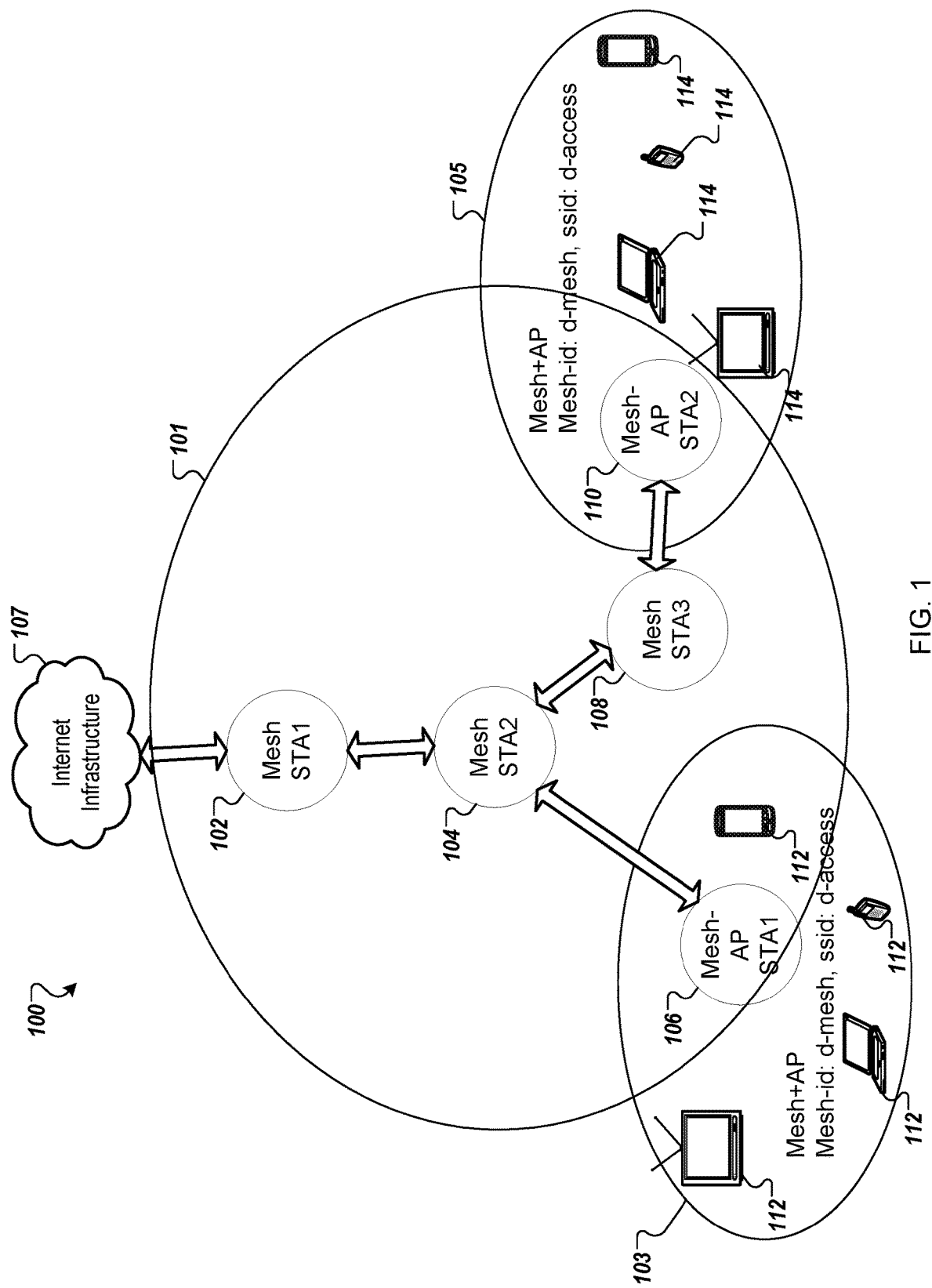
FIG. 1 is a network diagram of a wireless network having multiple wireless network devices each configured to operate as a mesh station in a wireless mesh network and multiple wireless network devices each configured to operate as a Mesh-Access Point (Mesh-AP) station in both the wireless mesh network and an access network according to one embodiment.

Technologies directed to allow a wireless network device with a single wireless local area network (WLAN) radio to act as a mesh station (Mesh station (STA)) and also an access point (AP) are described. Conventionally, separate radios are needed for a wireless network device to act as both an AP and a Mesh STA. For example, a radio of a wireless network device is usually put into one of three separate modes: Mesh Station mode, Station mode, or AP mode. The Mesh Basis Service Set (MBSS) protocols are quite different from the standard AP BSS protocol in terms of how links are formed between two wireless network devices and the related data traffic exchange. In a mesh network, a conventional mesh network device (also referred to as mesh node or mesh STA) on an edge of a wireless mesh network contains at least two radios, where one dedicated radio is put into the AP mode (referred to as the AP radio), allowing wireless client devices to connect to this radio of the mesh network device as the AP and at least one dedicated radio (referred to as the Mesh STA radio) to connect the mesh network device with one or more additional mesh network devices that are part of the wireless mesh network. In this case, the wireless client devices cannot directly connect to the Mesh STA radio and the other mesh network devices cannot directly connect to the AP radio. Therefore, these conventional mesh network devices need a minimum of two radios to allow backhaul communications in the wireless mesh network and access communications with wireless client devices in the access network.

Aspects of the present disclosure address the above and other deficiencies by providing an access network and AP functionality on a same radio used for the wireless mesh network and Mesh STA functionality in the mesh network that provides wireless backhaul. In other words, the mesh network device can use a single radio to provide simultaneous modes of operations: Mesh STA and AP mode or dual-mode operations. The mesh network device can use a single radio to provide collocated mesh and AP operations. In particular, the mesh network device can use the single radio to communicate with other mesh network devices that are part of the wireless mesh network using a first wireless protocol (e.g., MBSS protocol) and communicate with wireless client devices in an access network using a second wireless protocol (e.g., AP BSS protocol). The aspects of the present disclosure can reduce cost by using a single radio that provides simultaneous mesh and AP operation modes. The same radio can be used as a Mesh STA radio and as a regular AP radio to support wireless client devices connected to the radio. The single radio can be used to permit a wireless network device to act as an AP device and a mesh point device (edge node, relay node, or the like). The single radio can be used as access network to service WLAN devices (e.g., Wi-Fi® compatible devices) and act as a wireless bridge connecting to the wireless backhaul.

FIG. 1 is a network diagram of a wireless network having multiple wireless network devices 102-108 each configured to operate as a mesh station in a wireless mesh network 101 and multiple wireless network devices 106, 110 each configured to operate as a Mesh-AP station in both the wireless mesh network and an access network 103, 105 according to one embodiment. The wireless mesh network 101 includes a wireless network device 102 (labeled Mesh STA1) that communicates data with Internet infrastructure 107. The Internet infrastructure 107 may include one or more gateways, one or more cable or DSL modems, cellular stations, or the like. The wireless network device 102 is part of the wireless mesh network 101 and communicates data with other wireless network devices that are part of the wireless mesh network 101. For example, the wireless network device 102 communicates with the wireless network device 104 (labeled Mesh STA2). Similarly, the wireless network device 104 communicates with a wireless network device 108 (labeled Mesh STA3). The wireless network device 104 can also communicate data with a wireless network device 106 (labeled Mesh-AP STA1) that is considered an endpoint station that is part of the wireless mesh network 101. Similarly, the wireless network device 108 communicates with a wireless network device 110 (labeled Mesh-AP STA2) that is also considered an endpoint station that is part of the wireless mesh network 101. The wireless network device 106 is considered a dual-mode station that concurrently operates as both a mesh station and an AP station in a specified mode. In the specified mode, the wireless network device 106 can be configured to use a single radio to communicate data with the wireless network device 104 (or other wireless network devices) that is part of the wireless mesh network 101 using a mesh protocol (e.g., a first type of wireless protocol used for mesh communications) and communicate data with one or more wireless client devices 112 in a first access network 103 using a AP protocol (e.g., a second type of wireless protocol used for AP communications). Similarly, the wireless network device 110 can be configured to use a single radio to communicate data with the wireless network device 108 (or other wireless network devices) that is part of the wireless mesh network 101 using the mesh protocol and communicate data with one or more wireless client devices 114 in a second access network 105 using the AP protocol. The first access network 103 is a wireless computer network that allows one or more wireless devices to connect to the wireless network device 110 and provide access to remote servers, such as data, resources, or services provided by other devices in the mesh or other devices beyond the mesh network in the Internet infrastructure 107. The wireless devices that connect to the wireless network device 110 in the first access network 103 are referred to as wireless client devices, end-point devices, client-consumption devices, audio-video devices, sink devices, or wireless stations. Wireless stations in the first access network 103 can include wireless network interface controllers that allows the devices to connect to other wireless devices, such as access points (e.g., wireless routers) that can operates as base stations for the access network. Wireless stations can be mobile devices, computers, TVs, TV dongles, set-top boxes, and various other electronic devices with a wireless network interface. In contrast, the wireless mesh network 101 is a wireless computer network that allows two or more wireless devices to connect to one another for backhaul communicates. In essence, the wireless client devices, as described herein, are not access points or mesh stations. In one embodiment, the first access network 103 is a wireless local area network (WLAN). Alternatively, other access networks can be provided by the wireless network device 110. The second access network 105 can be similar or dissimilar to the first access network 103.

The wireless network device 106 and the wireless network device 110 are configured to have both Mesh and AP functionality. In some embodiments, the wireless network device 106 and the wireless network device 100 include a single radio for both Mesh and AP functionality. In other embodiments, the wireless network device 106 and the wireless network device 110 are multi-radio mesh nodes, where each device can have multiple radios that communicate with multiple devices that are part of the wireless mesh network 101. One of these multiple radios can be selected to operate as the single radio for both Mesh and AP functionality (also referred to as simultaneous mesh and AP mode). For example, the mesh radio that has the least network load can be selected as a candidate radio for simultaneous mesh and AP mode. This selected radio performs simultaneous Mesh and AP modes of operation. That is the selected radio can receive and process mesh frames and AP frames accordingly. The wireless network device 106 and wireless network device 110 can operate as part of the wireless mesh network 101, as well as provide access network, AP functionality on the same radio service as the mesh STA. The wireless network device 106 and wireless network device 110 can determine whether the frames are directed to mesh operations or directed to AP operations of the device and can process the frame accordingly. Additional details on frame processing are described below with respect to FIG. 2.

In one embodiment, the wireless network device 106 is an electronic device that includes a radio and a processor coupled to the radio. The processor includes first processing logic (also referred to as mesh processing logic or a mesh protocol stack) and second processing logic (also referred to as AP processing logic or an AP protocol stack. The processor sends, via the radio in a first mode of the electronic device, first data that identifies the electronic device as a mesh station that is part of the wireless mesh network 101. The processor sends, via the radio in a second mode of the electronic device, second data that identifies the electronic device as concurrently being the mesh station that is part of the wireless mesh network and an AP in the first access network 103. For example, the wireless network device 106 can send a single beacon or multiple beacons to identify the dual-mode capability. For example, the single beacon can include the mesh identifier for the wireless mesh network 101 and a SSID for the first access network 103 (e.g., Mesh-AP beacon—mesh-id: d-mesh, ssid: d-access). Alternatively, the mesh identifier can be broadcast in a first beacon frame (mesh beacon) and the SSID can be broadcast in a second beacon frame (AP beacon) via the same radio. Other devices can use the beacon(s) to connect to the wireless network device 106 as a mesh station while other devices can use the beacon(s) to connect to the wireless network device 106 as an AP. The wireless network device 106 can receive frames from these different devices and need to differentiate between the frame types and whether the frames are directed to the mesh station or the AP. For example, the processor receives a first frame via the radio and determines that the first frame is directed to the mesh station. The processor process the first frame using the first processing logic (e.g., mesh protocol stack). The processor receives a second frame via the radio and determines that the second frame is directed to the AP. The processor process the second frame using the second processing logic (e.g., AP protocol stack). The processor can process various types of frames, including data frames, control frames, and management frames for both AP frames and mesh frames as described herein.

In a further embodiment, the processor sends the second data that identifies the wireless mesh network 101 in a first beacon and a second beacon. The first beacon can include i) a mesh identifier (mesh ID) that identifies the wireless network device as a mesh station as part of the wireless mesh network 101 and ii) a mesh configuration element. The second beacon can include a SSID of the first access network 103. In another embodiment, the processor sends a single beacon for both purposes. In particular, the single beacon includes the mesh ID, the mesh configuration element, and the SSID of the first access network 103. Similarly, the wireless network device 110 can send a single beacon or two separate beacons to identify the wireless network device 110 as a mesh station that is part of the wireless mesh network 101 and an AP for the access network 105 to provide access to the wireless client devices 114.

In some embodiment, the first processing logic includes control path logic (also referred to as mesh control processing logic) and data path logic (also referred to as mesh data processing logic). The processor determines that the first frame is a data frame directed to the mesh station and processes the data frame using the data path logic. The processor can also determine that the first frame is a control frame or a management frame directed to the mesh station and processes the control or management frame using the control path logic. Similarly, the second processing logic includes control path logic (also referred to as AP control processing logic) and data path logic (also referred to as AP data processing logic). The processor determines that the second frame is a data frame directed to the AP and processes the data frame using the data path logic. The processor can also determine that the second frame is a control frame or a management frame directed to the AP and processes the control or management frame using the control path logic.

In one embodiment, the processor determines that the first frame is directed to the mesh station by determining that the first frame is a management frame and that the management frame includes a mesh identifier associated with the mesh station. Alternatively, the processor determines that the first frame is directed to the mesh station by determining that the first frame is a data frame and the data frame includes control information that indicates that the data frame is directed from a distribution system (e.g., FromDS subfield in a frame control field). The control information can indicate that the data frame originated from another mesh station that is part of the wireless mesh network. In another embodiment, the processor determines that the first frame is directed to the mesh station by determining that the first frame is a management frame and that the management frame is a mesh management frame. An example of a mesh management frame is a Hybrid Wireless Mesh Protocol (HWMP) Mesh Path Selection frame. Alternatively, other mesh management frames can be detected to determine that the frame is directed to the mesh station.

In one embodiment, the processor determines that the second frame is directed to the AP by determining that the second frame is a management frame and that the management frame does not include a mesh identifier. Alternatively, the processor can determine that the second frame is a data frame and the data frame includes control information that indicates that the data frame is directed to a distribution system (e.g., ToDS subfield of a control frame field). The control information can indicate that the data frame originated from a wireless client device that is part of the access network.

In another embodiment, the processor receives a frame at the radio and determines a frame type of the frame. The frame can be a data frame, a control frame, or a management frame. The processor determines that the frame is a mesh frame type or that the frame includes a mesh identifier responsive to the first frame being a control frame or a management frame. The processor processes, using the first processing logic (e.g., mesh protocol stack), the frame as being directed to the mesh station when the frame is the mesh frame type, or the frame includes the mesh identifier. Alternatively, the processor processes, using the second processing logic (e.g., AP protocol stack), the frame as being directed to the AP when the frame is not the mesh frame type or the frame does not include the mesh identifier. Alternatively, the processor can process the frame as being directed to the AP when other conditions are met.

In another embodiment, the wireless network device 106 can provide traffic bridging. In particular, the radio operating as a simultaneous Mesh and AP mode can create two virtual network interfaces, including a WLAN-mesh interface (e.g., wifi-mesh interface) for the mesh data path and a WLAN-access interface (wifi-access interface) for the AP data path. The processor creates a first virtual network interface for the first processing logic (e.g., specifically the mesh data path logic and a second virtual network interface for the second processing logic (e.g., specifically the AP data path logic). A data frame received from an associated WLAN device (e.g., wireless client device 112) that needs routing to the Internet via the Internet infrastructure 107 is delivered to WLAN-mesh interface. A data frame can be received from the WLAN device (e.g., device 112) that is addressed to a remote server. The remote server can be any of the devices in the wireless mesh network, as well as devices beyond the mesh network, such as a CDN server (e.g., edge server), a gateway, a modem, an Internet infrastructure device, or the like. The data frames can be audio and video content or web services. The data frames can be data from web services, web resources, or the like. The data frame can be address to any device that is not part of the access network. Similarly, a data frame received over the wireless mesh network 101 and not addressed to the radio of the receiving wireless network device is delivered to WLAN-access interface. This provides mirror traffic from one virtual interface to the other. Upon receiving a data frame, for which there is no destination associated to the AP, the AP data path can drop the frame. In one embodiment, the processor determines that the first frame is not addressed to the wireless network device 106 and sends the first frame to the second virtual network interface. The processor can determine that the second frame needs routing to the Internet and can send the second frame to the first virtual network interface. Additional details regarding frame processing by the wireless network device in the Mesh-AP mode are described below with respect to FIG. 2.

Figure 2:
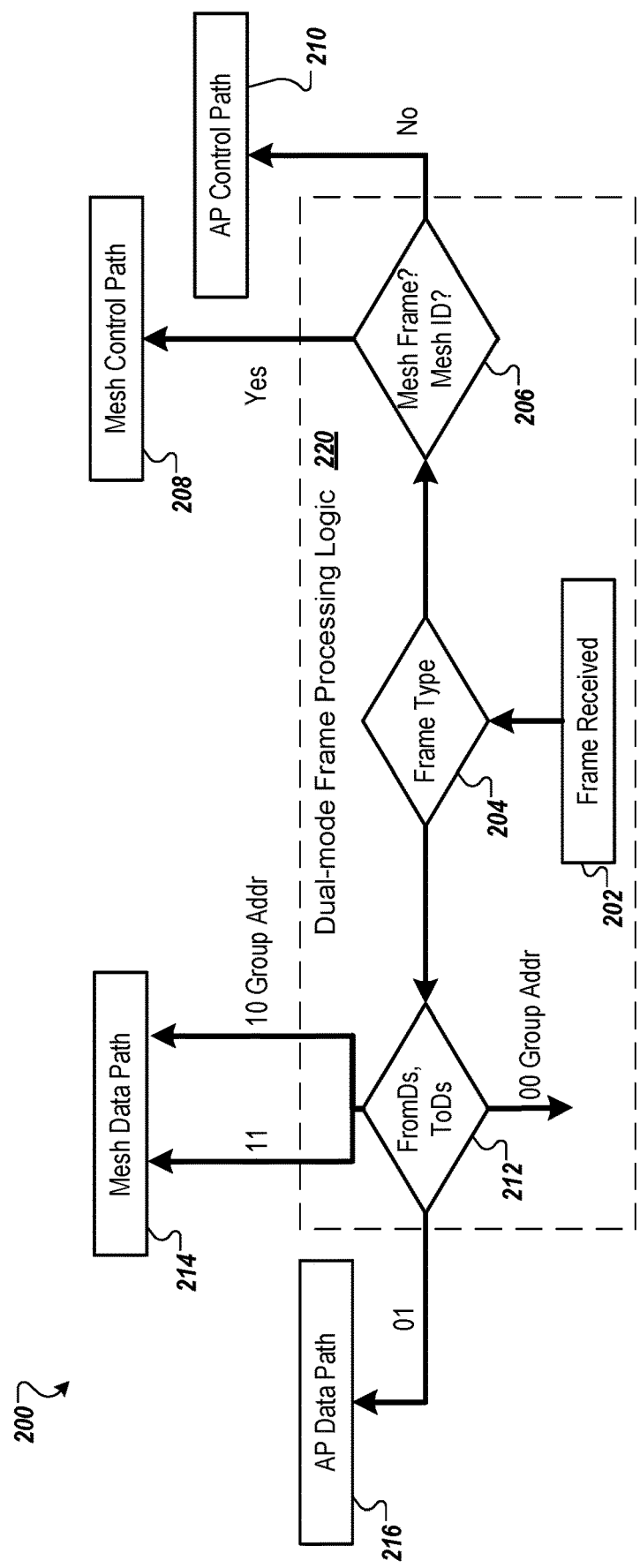
FIG. 2 is a flow diagram of a dual-mode frame processing logic of a wireless network device operating as both a mesh station and an AP according to one embodiment.

FIG. 2 is a flow diagram of a dual-mode frame processing logic 220 of a wireless network device 200 operating as both a mesh station and an AP according to one embodiment. The dual-mode frame processing logic 220 can comprises hardware (e.g., circuitry, dedicated logic, programmable logic, microcode, etc.), software, firmware, or a combination thereof. The wireless network device 200 also includes mesh control path logic 208, AP control path logic 210, mesh data path logic 214, and AP data path logic 216. These can also be implemented as hardware (e.g., circuitry, dedicated logic, programmable logic, microcode, etc.), software, firmware, or a combination thereof. In the depicted embodiment, the processing logic of FIG. 2 is implemented as software logic components. In other embodiments, the processing logic of FIG. 2 can be implemented as a single software component or multiple software components.

The dual-mode frame processing logic 220 receives a frame (block 202). The dual-mode frame processing logic 220 determines a frame type of the frame (block 204). When the dual-mode frame processing logic 220 determines that the frame is a data frame at block 204, the dual-mode frame processing logic 220 determines whether the data frame is directed to the mesh station or the AP (block 212). In the depicted embodiment, the dual-mode frame processing logic 220 determines the contents of subfields of a control frame field of the frame, including the FromDS subfield and the ToDS subfield. When the dual-mode frame processing logic 220 determines that the frame is directed to the mesh station at block 212, the dual-mode frame processing logic 220 sends the frame to the mesh data path logic 214 and the mesh data path logic 214 processes the data frame. When the dual-mode frame processing logic 220 determines that the frame is directed to the AP at block 212, the dual-mode frame processing logic 220 sends the frame to the AP data path logic 216 and the AP data path logic 216 processes the data frame.

In one embodiment, dual-mode frame processing logic 220 at block 212 determines that the data frame includes a first bit that is not set in a first subfield (FromDS subfield) of a frame control field and a second bit that is set in a second subfield (ToDS subfield) of the frame control field. The first bit not being set and the second bit being set indicate that the data frame is directed to the AP and the dual-mode frame processing logic 220 sends the data frame to the AP data path logic 216 and the AP data path logic 216 processes the data frame. In another embodiment, dual-mode frame processing logic 220 at block 212 determines that the data frame includes a first bit that is set in a first subfield (FromDS subfield) of a frame control field and a second bit that is either set or not set in a second subfield (ToDS subfield) of the frame control field. The first second bit being set indicates that the data frame is directed to the mesh station and the dual-mode frame processing logic 220 sends the data frame to the mesh data path logic 214 and the mesh data path logic 214 processes the data frame.

In another embodiment, the dual-mode frame processing logic 220 determines at block 204 that the frame is a control frame or a management frame. When the dual-mode frame processing logic 220 determines that the frame is a control or management frame at block 204, the dual-mode frame processing logic 220 determines whether the control or management frame is directed to the mesh station or the AP (block 206). In the depicted embodiment, the dual-mode frame processing logic 220 determines whether the control or management frame is a mesh frame or includes a mesh identifier (mesh ID) (block 206). When the dual-mode frame processing logic 220 determines that the control or management frame is a mesh frame or includes the mesh identifier at block 206, the dual-mode frame processing logic 220 sends the control or management frame to the mesh control path logic 208 and the mesh control path logic 208 processes the control or management frame. When the dual-mode frame processing logic 220 determines that the control or management frame is not a mesh frame and does not include the mesh identifier at block 206, the dual-mode frame processing logic 220 sends the control or management frame to the AP control path logic 210 and the AP control path logic 210 processes the control or management frame.

As described herein, some control path changes includes how beacons are sent via the radio. When the device radio is configured into the simultaneous Mesh and AP mode, the radio can send two beacons, one beacon (Mesh beacon) for the mesh station containing the Mesh ID and mesh configuration element and another beacon (AP beacon) for the AP for the access network, the other beacon containing the AP's SSID and other capabilities. In some embodiments, to save beacon overhead, a single beacon can be transmitted containing both SSID and Mesh ID elements that can indicate the simultaneous Mesh and AP capabilities of the wireless network device 200. The sending of beacons in this manner is not a standard mode of operation. When the wireless network device 200 receives a beacon, the mesh station logic of the wireless network device 200 can ignore infrastructure AP elements in the AP beacon and in other management frames. Similarly, the AP logic of the wireless network device 200 can ignore mesh elements contained in the mesh beacon and in other management frames. It should be noted that wireless network devices that are part of the wireless mesh network 101, such as wireless network device 104 (Mesh STA2) only processes mesh elements contained in the mesh beacon and ignores the infrastructure AP elements in the AP beacon since the wireless network device 104 is not configured as a mesh-AP station like wireless network device 106. An AP and non-mesh stations, such as wireless client devices 112, 114, only process AP elements in the AP beacon and ignore mesh elements contained in the mesh beacon. This can avoid any potential issue due to collocated capabilities on the same radio. In particular, current IEEE 802.11 wireless standards can prohibit collocated mesh and AP operations. By using the dual-mode frame processing logic 220 the wireless network devices can perform collocated mesh and AP operations.

In one embodiment, the management frames used for network scans are processed by the mesh control path logic 208 if the management frames carry Mesh ID element (as per required under the current wireless specifications). These management frames are ignored by the AP control path logic 210 in the same radio. This allows the mesh control path logic 208 to process and reply only to the management frames originated from the mesh nodes that are part of the wireless mesh network 101, and ignore all other management frames originated by non-mesh, traditional WLAN devices, seeking connection to the AP. For management frames, where Mesh ID element is optional as specified the current IEEE 802.11s standard, the embodiments described herein insert or otherwise add a Mesh ID element to allow identification of management frames for the mesh control path logic 208 from management frames for the AP control path logic 210. This disambiguates the processing of the received management frames. A Mesh STA that is part of the wireless mesh network 101 can insert Mesh ID element into frame whenever applicable, such as frames used for De-Authentication, Probe Request, Probe Response, and Beacon. Mesh specific management frames may not have Mesh ID. For example, the Mesh HWMP frames do not need to carry Mesh ID as they are ignored by the AP control path logic 210. Similarly, wireless client devices 112, 114, sending frames for Authentication, Association, Disassociation, and Probe Request/Response Actions are processed by the AP control path logic 210. These frames do not carry Mesh ID element. That is, some mesh management frames are not required to carry a mesh ID element. It should be noted that the mesh nodes can be under control of a centralized controller that can configured the mesh nodes to include Mesh ID where needed, whereas the wireless client devices 112, 114 connecting to the AP may not necessarily be controlled by the centralized controller. Adding Mesh ID on the frames originated by the mesh stations allow the disambiguation between management frames. The Mesh ID element, when inserted into Mesh Management frames that are not required to carry Mesh ID element, allows Mesh and AP mode receivers of such frames to unambiguously process this either in their Mesh Management or AP management path. For example, Deauthentication frame conventionally does not have Mesh ID, therefore a Mesh and AP mode receiver may not know whether to process the Deauthentication frame in the context of Mesh Management Path or Access Point Management Path without the Mesh ID being inserted. The Mesh ID can also allow such distinctions in addition to the source MAC address.

As described herein, some data path changes include how data frames are processed. When a mesh radio that is configured as a both mesh and AP mode, receives a data frame over the air, the dual-mode frame processing logic 220 can use certain rules to make sure which one of mesh data path logic 214 or the AP data path logic 216 processes the data frame. Table 1 shows one example of rules for classifying the data frame based on frame type/subtype and frame control (FC) field, including "FromDS" and "ToDS" subfields. These classifications allow a data frame to be handed over to either the mesh data path logic 214 or the AP data path logic 216 running in the same radio. That is Mesh datapath code and AP datapath code run in the same radio and the dual-mode frame processing logic 220 can determine which code should handle processing the received frame.

TABLE 1

Processing Data Frames

| 'FromDS' subfield/<br>'ToDS' subfield | Mesh<br>Datapath | AP Data<br>Path |
| --- | --- | --- |
| 00 | X | X |
| 01 | | X |
| 10 | X (if broadcast, multicast) | |
| 11 | X | |

Figure 3A:
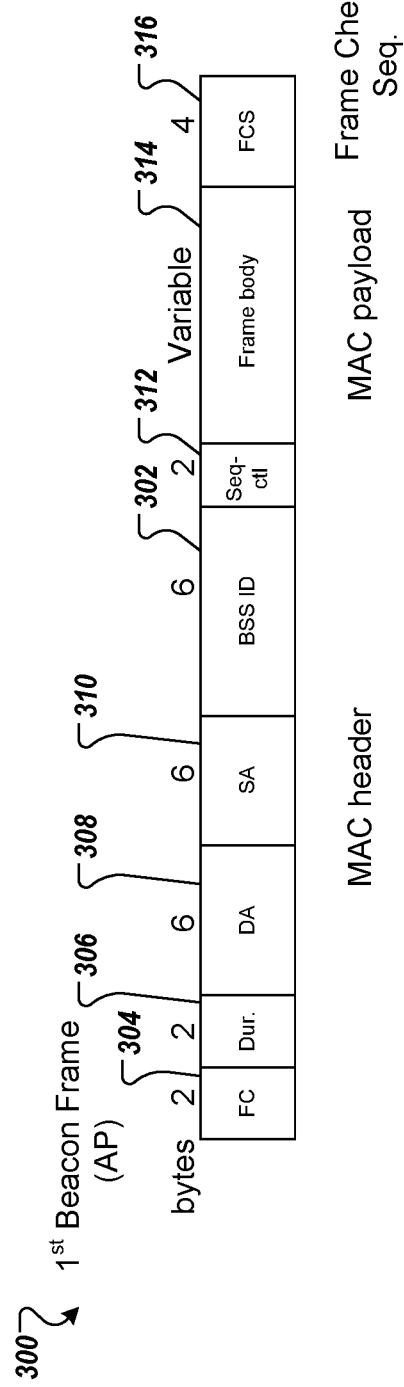
FIGS. 3A-3B are examples of a first beacon frame with a service set identifier (SSID) of the access network and a second beacon frame with a mesh identifier transmitted by the wireless network device in a second mode, according to one embodiment.
Figure 3B:
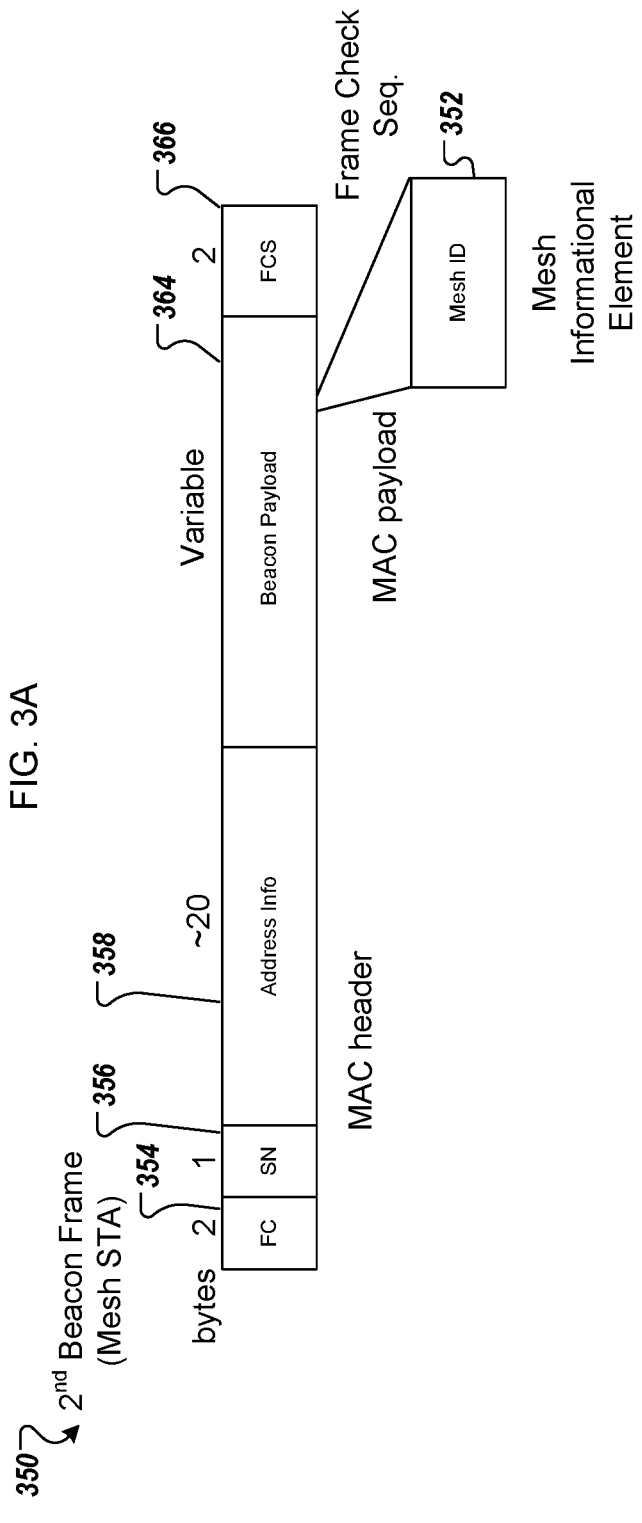

FIGS. 3A-3B are examples of a first beacon frame 300 with a SSID 302 of the access network and a second beacon frame 350 with a mesh identifier 352 transmitted by the wireless network device in a mesh-AP mode, according to one embodiment. Referring to FIG. 3A, the first beacon frame 300 can include a SSID 302 in a SSID field. The first beacon frame 300 can also include other fields, such as a frame control (FC) field 304, a duration field 306, address fields such as destination address 308 and source address 310, sequential control filed 312, a frame body 314, and a frame check sequence field 316. These fields are exemplary fields of the first beacon frame 300, but other fields may be used. In general, the first beacon frame 300 can include a MAC header, a MAC payload, and a frame check (also referred to as MAC footer). As described above with respect to FIG. 2, the first beacon frame 300 can be received and the processing logic can determine that the first beacon frame 300 is directed to the AP using the SSID 302. In other embodiments, the MAC payload can have additional information about the AP that can be used to determine that the first beacon frame 300 is directed to the AP. The mesh station can ignore the first beacon frame 300.

Referring to FIG. 3B, the second beacon frame 350 can include a mesh ID 352 in a beacon payload 364. The second beacon frame 350 can also include other fields, such as a frame control (FC) field 354, a sequence number (SN) field 356, address fields 358, and the frame check sequence field 366. These fields are exemplary fields of the second beacon frame 350, but other fields may be used. In general, the second beacon frame 350 can include a MAC header, a MAC payload, and a frame check (also referred to as MAC footer). As described above with respect to FIG. 2, the second beacon frame 350 can be received and the processing logic can determine that the second beacon frame 350 is directed to the mesh station using the mesh ID 352. In other embodiments, the MAC payload can have additional information about the mesh that can be used to determine that the second beacon frame 350 is directed to the mesh station. The AP can ignore the second beacon frame 350.

FIG. 4A is an example of an AP frame with a frame control field according to one embodiment. The AP frame 400 can include a SSID 402 in a SSID field. The AP frame 400 can also include other fields, such as a frame control (FC) field 404, a duration field 406, address fields such as destination address 408 and source address 410, sequential control filed 412, a frame body 414, and a frame check sequence field 416. These fields are exemplary fields of the AP frame 400, but other fields may be used. In general, the AP frame 400 can include a MAC header, a MAC payload, and a frame check (also referred to as MAC footer). The frame control field 404 can include multiple subfields, including a From Distribution System (FromDS) subfield and To Distribution System (ToDS) subfield 418. As described above with respect to FIG. 2, the AP frame 400 can be received and the processing logic can determine that the AP frame 400 is directed to the AP using information in the frame control field 404. For example, the processing logic can determine that the AP frame 400 is a data frame and can use the FromDS and ToDS subfields to determine that the AP frame 400 is directed to the AP. As noted herein, the FromDS and ToDS subfields 418 can be used to indicate whether the AP frame 400 is directed to the AP. For example, when the FromDS subfield is not set and the second bit is set, the frame can be determined to be directed to the AP. In other embodiments, the MAC payload can have additional information about the AP that can be used to determine that the AP frame 400 is directed to the AP. The mesh station can ignore the AP frame 400.

In other embodiments, the AP frame 400 can be a control frame or a management frame and other information in the AP frame 400 can be used to determine the type of the AP frame and that AP frame 400 is directed to the AP and not the mesh station.

FIG. 4B is an example of a mesh frame with a frame control field according to one embodiment. The mesh frame 450 can include a mesh ID 452 in a beacon payload 464. The mesh frame 450 can also include other fields, such as a frame control (FC) field 454, a sequence number (SN) field 456, address fields 458, and the frame check sequence field 466. These fields are exemplary fields of the mesh frame 450, but other fields may be used. In general, the mesh frame 450 can include a MAC header, a MAC payload, and a frame check (also referred to as MAC footer). The frame control field 454 can include multiple subfields, including a From Distribution System (FromDS) subfield and To Distribution System (ToDS) subfield 458. As described above with respect to FIG. 2, the mesh frame 450 can be received and the processing logic can determine that the mesh frame 450 is directed to the mesh station using information in the frame control field 404. For example, the processing logic can determine that the mesh frame 450 is a data frame and can use the FromDS and ToDS subfields 458 to determine that the mesh frame 450 is directed to the mesh station. As noted herein, the FromDS and ToDS subfields can be used to indicate whether the mesh frame 450 is directed to the mesh station. For example, when the FromDS subfield is set and the second bit is either set or not set, the frame can be determined to be directed to the mesh station. In other embodiments, the MAC payload can have additional information about the mesh station that can be used to determine that the mesh frame 450 is directed to the mesh station. The AP can ignore the mesh frame 450.

In other embodiments, the mesh frame 450 can be a control frame or a management frame and other information in the mesh frame 450 can be used to determine the type of the mesh frame 450 and that the mesh frame 450 is directed to the mesh station and not the AP.

Figure 5:
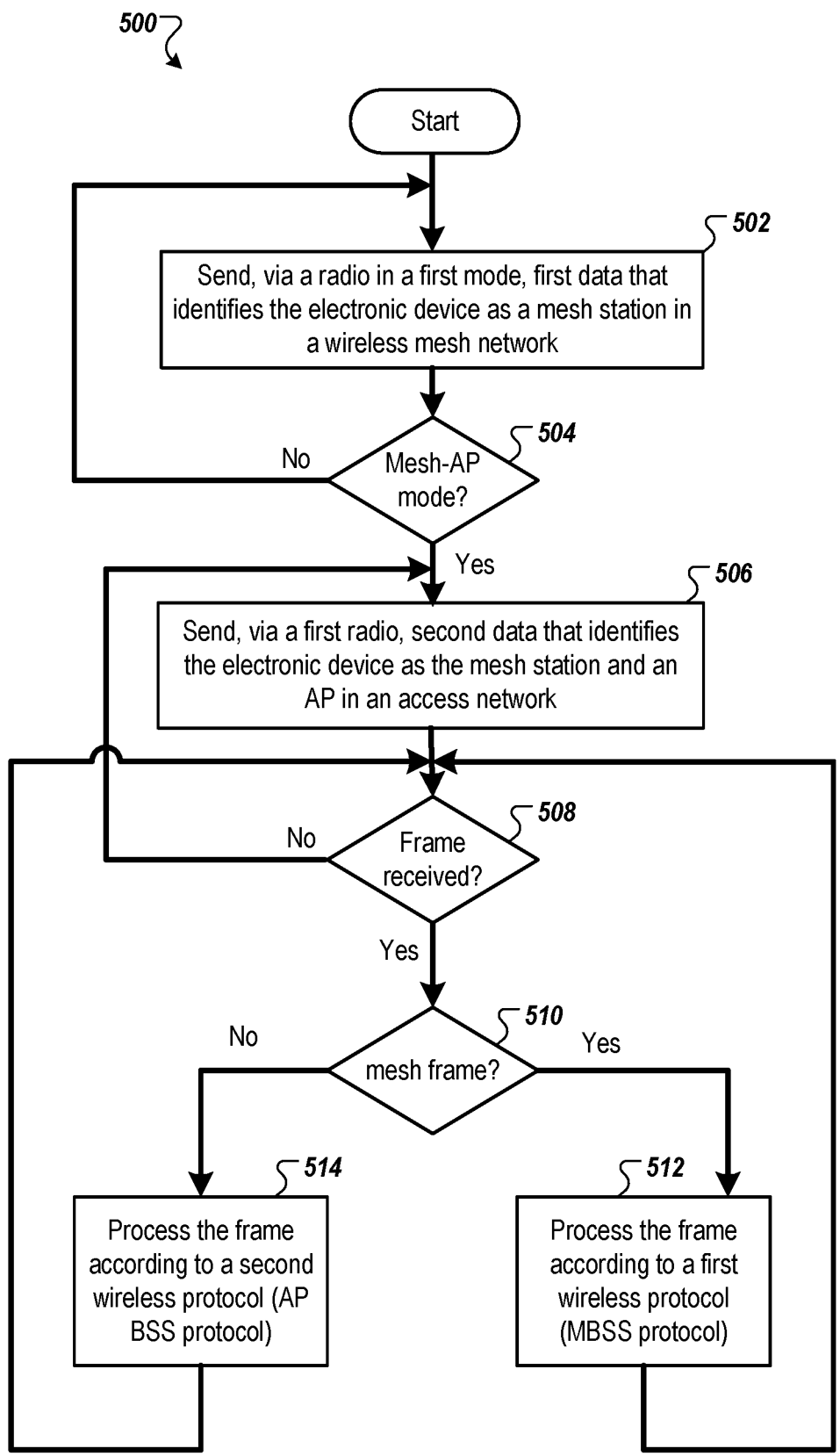
FIG. 5 a flow diagram of a method of processing a frame according to a first wireless protocol or a second wireless protocol according to one embodiment.

FIG. 5 a flow diagram of a method 500 of processing a frame according to a first wireless protocol or a second wireless protocol according to one embodiment. The method 500 may be performed by processing logic that comprises hardware (e.g., circuitry, dedicated logic, programmable logic, microcode, etc.), software, firmware, or a combination thereof. In one embodiment, the wireless network device 106 or 110 of FIG. 1 performs the method 500. In another embodiment, the wireless network device 200 of FIG. 2 performs the method 500. Alternatively, an application processor of any of the wireless network devices described herein with respect to FIGS. 1-4 can perform the method 500. Alternatively, a processing device or a processor of an electronic device can perform the method 500.

Referring to FIG. 5, the method 500 begins by the processing logic sending, via a radio of an electronic device in a first mode, first data that identifies the electronic device as a mesh station in a wireless mesh network (block 502). The processing logic can receive control information that causes the electronic device to change from the first mode to a second mode, such as the mesh-AP mode described herein. In the mesh-AP mode, the electronic device operates as both the mesh station that is part of the wireless mesh network and an AP of an access network. The processing logic determines whether the electronic device should be in the Mesh-AP mode at block 504. When the electronic device is a mesh station only, the processing logic returns to block 502 and can continue to send the first data that identifies the electronic device as a mesh station that is part of the wireless mesh network. When the electronic device is a mesh-AP mode at block 504, the processing logic sends, via the radio of the electronic device, second data that identifies the electronic device as concurrently being the mesh station that is part of the wireless mesh network and an access point (AP) in an access network (block 506). At block 508, the processing logic determines whether a frame is received at the radio. When no frame is received, the processing logic returns to block 506. When a first frame is received from a second device at block 508, the processing logic determines whether the first frame is a mesh frame directed to the mesh station (block 510). When the first frame is a mesh frame, the processing logic processes the first frame according to a first wireless protocol (e.g., MBSS protocol) (block 512), and returns to block 508. When the first frame is not a mesh frame, the processing logic processes the first frame according to a second wireless protocol (e.g., standard AP BSS protocol) (block 514), and returns to block 508.

In one embodiment, the processing logic at block 506 sends a first beacon with a mesh identifier of the mesh station that is part of the wireless mesh network and a mesh configuration element and separately sends a second beacon with a SSID of the access network. In another embodiment, the processing logic at block 506 sends a single beacon with a mesh identifier of the mesh station that is part of the wireless mesh network, a mesh configuration element, and a SSID of the access network.

In another embodiment, at block 510, the processing logic determines a frame type. The frame types can data frames, control frames, or management frames. The processing logic can determine whether the frame is a mesh type or has a mesh identifier responsive to the frame being a control frame or a management frame. The processing logic can determine whether the frame includes control information that indicates that the second frame is directed to a distribution system or directed from a distribution system in connection with determining that the frame is a data frame type.

In another embodiment, the processing logic creates a first virtual network interface and a second virtual network interface. The processing logic can determine whether the frame is addressed to the electronic device and can send the frame to the second virtual network interface responsive to the frame not being addressed to the electronic device. The processing logic can determine that the frame needs routing to the Internet and can send the frame to the first virtual network interface responsive to the frame needing to be routed to the Internet.

Figure 6:
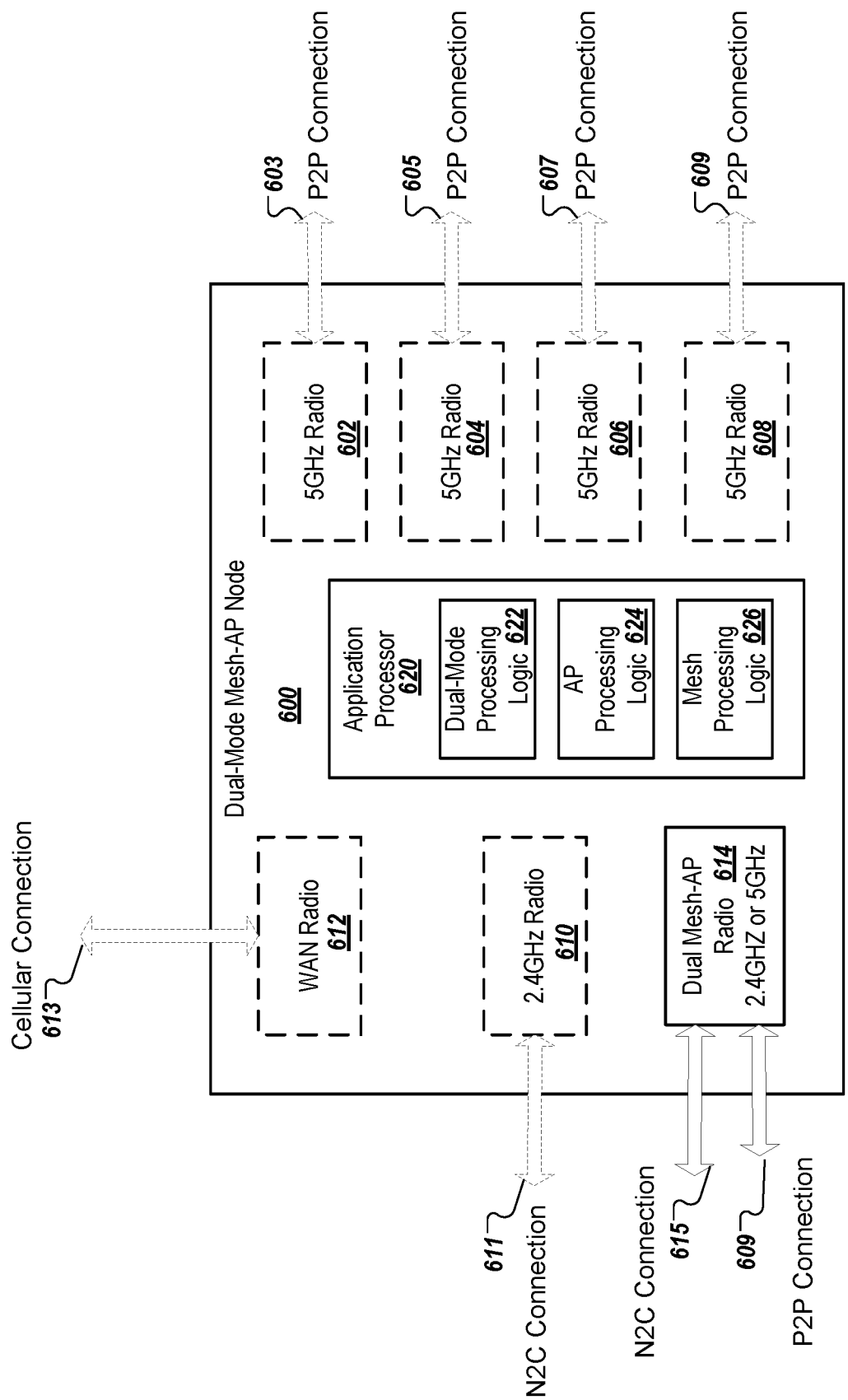
FIG. 6 is a block diagram of a dual-mode mesh-AP node with a dual mesh-AP radio according to one embodiment.

FIG. 6 is a block diagram of a dual-mode mesh-AP node 600 with a dual mesh-AP radio 615 according to one embodiment. In one embodiment, the dual-mode mesh-AP node 600 is a wireless network device that includes a single WLAN radio 614 and an application processor 620 coupled to the single WLAN radio 614. The application processor 620 can include dual-mode frame processing logic 622, AP processing logic 624, and mesh processing logic 626. The AP processing logic 624 can include separate path logic for data and control paths. For example, the AP processing logic 624 can include AP data path logic and AP control path logic. Similarly, the mesh processing logic 626 can include mesh data path logic and mesh control path logic. The dual-mode frame processing logic 622 broadcasts, in a first mode via the WLAN radio 614, a first beacon. The first beacon includes a mesh identifier of the dual-mode mesh-AP node 600 in a wireless mesh network. The first beacon can also include a mesh configuration element. The dual-mode mesh-AP node 600 operates as a mesh station in the first mode. The dual-mode mesh-AP node 600 can receive control information that causes the dual-mode mesh-AP node 600 to change from the first mode to a second mode. The dual-mode mesh-AP node 600 operates as both the mesh station that is part of the wireless mesh network and an AP of an access network in the second mode. The dual-mode frame processing logic 622 broadcasts, via the WLAN radio 614 in the second mode, the first beacon, and a second beacon. The second beacon includes a SSID of the access network to provide AP functionality to the mesh station for wireless client devices in the access network.

In the second mode, the dual-mode frame processing logic 622 receives, via the single WLAN radio 614, a first frame from a second wireless network device. The dual-mode frame processing logic 622 determines that the first frame is a first management frame and determines that the first management frame includes the mesh ID. The dual-mode frame processing logic 622 sends the first management frame to the mesh processing logic 626 (e.g., mesh control path logic) and the mesh processing logic 626 processes the first management frame. The dual-mode frame processing logic 622 receives, via the single WLAN radio 614, a second frame from a wireless client device. The dual-mode frame processing logic 622 determines that the second frame is a second management frame and determines that the second management frame does not include a mesh identifier and is not a mesh frame. The dual-mode frame processing logic 622 sends the second management frame to the AP processing logic 624 (e.g., AP control path logic) and the AP processing logic 624 processes the second management frame.

In a further embodiment, the dual-mode frame processing logic 622, in the second mode, receives, via the single WLAN radio 614, a third frame the wireless client device. The dual-mode frame processing logic 622, determines that the third frame is a first data frame and determines that the first data frame includes frame control information that indicates that the first data frame is directed to the AP. For example, the dual-mode frame processing logic 622 can determine that a first bit that is not set in a first subfield of a frame control field and a second bit that is set in a second subfield of the frame control field. The first bit not being set and the second bit being set indicate that the third frame is directed to the AP. The dual-mode frame processing logic

622 sends the third data frame to the AP data path logic and the AP data path logic processes the first data frame.

In another embodiment, the dual-mode frame processing logic 622, in the second mode, receives a fourth frame via the single WLAN radio 614. The dual-mode frame processing logic 622 determines that the fourth frame is a second data frame and determines that the second data frame includes frame control information that indicates that the second data frame is directed to the mesh station. For example, the dual-mode frame processing logic 622 determines that a first bit that is set in a first subfield of a frame control field to indicate that the second data frame is directed to the mesh station. It should be noted that a second bit can either be set or not set in a second subfield of the frame control field.

In the embodiment above, the dual-mode mesh-AP node 600 includes a single WLAN radio 614. The single WLAN radio 614 creates a peer-to-peer (P2P) wireless connection 609 between the dual-mode mesh-AP node 600 and another mesh node (not illustrated) that is part of the wireless mesh network. The single WLAN radio 614 also creates a node-to-client (N2C) wireless connection 615 between the dual-mode mesh-AP node 600 and a client consumption device (not illustrated) in the access network. In other embodiments, the dual-mode mesh-AP node 600 includes additional radios, but these radios are used for other wireless connections, not the connections used for the mesh station and AP mode of the single WLAN radio 614. For example, the dual-mode mesh-AP node 600 can include a first 5 GHz radio 602, a second 5 GHz radio 604, a third 5 GHz radio 606, a fourth 5 GHz radio 608, a 2.4 GHz radio 610, and a cellular radio 612. The first 5 GHz radio 602 creates a first P2P wireless connection 603 between the dual-mode mesh-AP node 600 and another mesh node (not illustrated) in a mesh network. The second 5 GHz radio 604 creates a second P2P wireless connection 605 between the dual-mode mesh-AP node 600 and another mesh node (not illustrated) in the mesh network. The third 5 GHz radio 606 creates a third P2P wireless connection 607 between the dual-mode mesh-AP node 600 and another mesh node (not illustrated) in the mesh network. The fourth 5 GHz radio 608 creates a fourth P2P wireless connection 609 between the dual-mode mesh-AP node 600 and another mesh node (not illustrated) in the mesh network. The 2.4 GHz radio 610 creates a N2C wireless connection 611 between the dual-mode mesh-AP node 600 and a client consumption device (not illustrated) in the mesh network. The N2C wireless connection may be one of a second set of one or more WLAN connections that operate at a second frequency of approximately 2.4 GHz. The cellular radio 612 creates a cellular connection between the dual-mode mesh-AP node 600 and a device in a cellular network (not illustrated). In other embodiments, more than one 2.4 GHz radios may be used for more N2C wireless connections. Alternatively, different number of 5 GHz radios may be used for more or less P2P wireless connections with other mesh nodes. In other embodiments, multiple cellular radios may be used to create multiple cellular connections.

In some embodiments, the dual-mode mesh-AP node 600 may be any one of the mesh network device described herein. In one embodiment, the dual-mode mesh-AP node 600 may be an ingress node or a mini-point-of-presence (POP) node that has attached storage and a network connection to access content outside of the mesh network. Multiple network hardware devices are wirelessly connected through a network backbone formed by multiple P2P wireless connections. These P2P wireless connections are wireless connections between different pairs of the network hardware devices. The P2P wireless connections may be a first set of WLAN connections that operate at a first frequency of approximately 5.0 GHz. The multiple network hardware devices may be wirelessly connected to one or more client consumption devices by one or more N2C wireless connections. Also, the multiple network hardware devices may be wirelessly connected to a mesh network control services (MNCS) device by cellular connections. Each network hardware device includes a cellular connection to a MNCS service hosted by a cloud computing system. The cellular connections may have lower bandwidths than the point-to-point wireless link.

During operation, the dual-mode mesh-AP node 600 may receive a first request for a first content file from a first client consumption device over the N2C connection 615. The dual-mode mesh-AP node 600 sends a second request for the first content file to a second network hardware device through the network backbone via a first set of zero or more intervening network hardware devices between the first network hardware device and the second network hardware device. For example, the dual-mode mesh-AP node 600 can request the first content file via the single WLAN radio 614 over the P2P connection 609. The dual-mode mesh-AP node 600 receives the first content file through the network backbone via the first set of zero or more intervening network hardware devices and sends the first content file to the first client consumption device over the N2C connection 615. In a further embodiment, the dual-mode mesh-AP node 600 includes the WAN radio 612 to wirelessly connect to a MNCS device by a cellular connection 613 to exchange control information.

In some embodiments, a path between the dual-mode mesh-AP node 600 and an ingress node (or any other mesh network device) could include zero or more hops of intervening network hardware devices. In some cases, the path may include up to 12-15 hops within a mesh network of N×N network hardware devices deployed in the mesh network.

In some embodiments, the dual-mode mesh-AP node 600 includes memory to store content files, control and command data, as well as the aggregate data described herein. The memory of the first network hardware device may be volatile memory, non-volatile memory, or a combination of both. When a content file is not stored in the memory or the storage of the dual-mode mesh-AP node 600, the dual-mode mesh-AP node 600 generates and sends a request to another node in the mesh network. Intervening network hardware devices can make similar determinations to locate the content file in the mesh network. In the event that the first content file is not stored in the mesh network, the content file can be requested from the mini-POP node. When the mini-POP node does not store the content file, the mini-POP can take action to obtain the first content file, such as requesting the first content file from a content delivery network (CDN) over a point-to-point link. Alternatively, the human in the loop process can be initiated as described herein.

In a further embodiment, the P2P wireless connections 603, 605, 607, 609 are WLAN connections that operate in a first frequency range and the N2C connections 611 are WLAN connections that operate in a second frequency range. In another embodiment, the P2P wireless connections 603, 605, 607, 609 operate at a first frequency of approximately 5.0 GHz and the N2C connections 611 operate at a second frequency of approximately 2.4 GHz.

In general, a wireless mesh network (WMN), containing multiple mesh network devices organized in a mesh topology, is described. The embodiments described herein can be used in connection with a mesh network that is used as a content delivery platform for content delivery or Internet services. In some cases, the content delivery platform can be deployed in environments with less Internet infrastructure or sufficient Internet infrastructure. One of the content delivery platforms can be based on wireless local area network (WLAN) technologies. WLAN connectivity operating in unlicensed spectrum offers a cost-effective and scalable solution for a wireless wide area network (WWAN) to be deployed over a large densely populated region. The network hardware devices are also referred to herein as mesh routers, mesh network devices, mesh nodes, Meshboxes, or Meshbox nodes. Multiple network hardware devices wirelessly are connected through a network backbone formed by multiple peer-to-peer (P2P) wireless connections (i.e., wireless connections between multiple pairs of the network hardware devices). The multiple network devices are wirelessly connected to one or more client consumption devices by N2C wireless connections. The multiple network devices are wirelessly connected to the MNCS device by cellular connections. The content file (or generally a content item or object) may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), or multi-media content. The client consumption devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The embodiments of the mesh network devices may be used to deliver content, such as video, music, literature, or the like, to users who do not have access to broadband Internet connections because the mesh network devices may be deployed in an environment of limited connectivity to broadband Internet infrastructure. In some of the embodiments described herein, the mesh network architecture does not include "gateway" nodes that are capable of forwarding broadband mesh traffic to the Internet. The mesh network architecture may include a limited number of POP nodes that do have access to the Internet, but the majority of mesh network devices is capable of forwarding broadband mesh traffic between the mesh network devices for delivering content to client consumption devices that would otherwise not have broadband connections to the Internet. Alternatively, instead of POP node having access to broadband Internet infrastructure, the POP node is coupled to storage devices that store the available content for the WMN. The WMN may be self-contained in the sense that content lives in, travels through, and is consumed by nodes in the mesh network. In some embodiments, the mesh network architecture includes a large number of mesh nodes, called Meshbox nodes. The WMN can scale to support a geographic area based on the number of mesh network devices, and the corresponding distances for successful communications over WLAN channels by those mesh network devices.

Although various embodiments herein are directed to content delivery, such as for the Amazon Instant Video (AIV) service, the WMNs, and corresponding mesh network devices, can be used as a platform suitable for delivering high bandwidth content in any application where low latency is not critical or access patterns are predictable. Alternatively, the embodiments described herein can be utilized for providing web services. The embodiments described herein are compatible with existing content delivery technologies, and may leverage architectural solutions, such as CDN services like the Amazon AWS CloudFront service. Amazon CloudFront CDN is a global CDN service that integrates with other Amazon Web services products to distribute content to end users with low latency and high data transfer speeds. The embodiments described herein can be an extension to this global CDN, but in environments where there is limited broadband Internet infrastructure. The embodiments described herein may provide users in these environments with a content delivery experience equivalent to what the users would receive on a traditional broadband Internet connection. The embodiments described herein may be used to optimize deployment for traffic types (e.g. streaming video) that are increasingly becoming a significant percentage of broadband traffic and taxing existing infrastructure in a way that is not sustainable.

Figure 7:
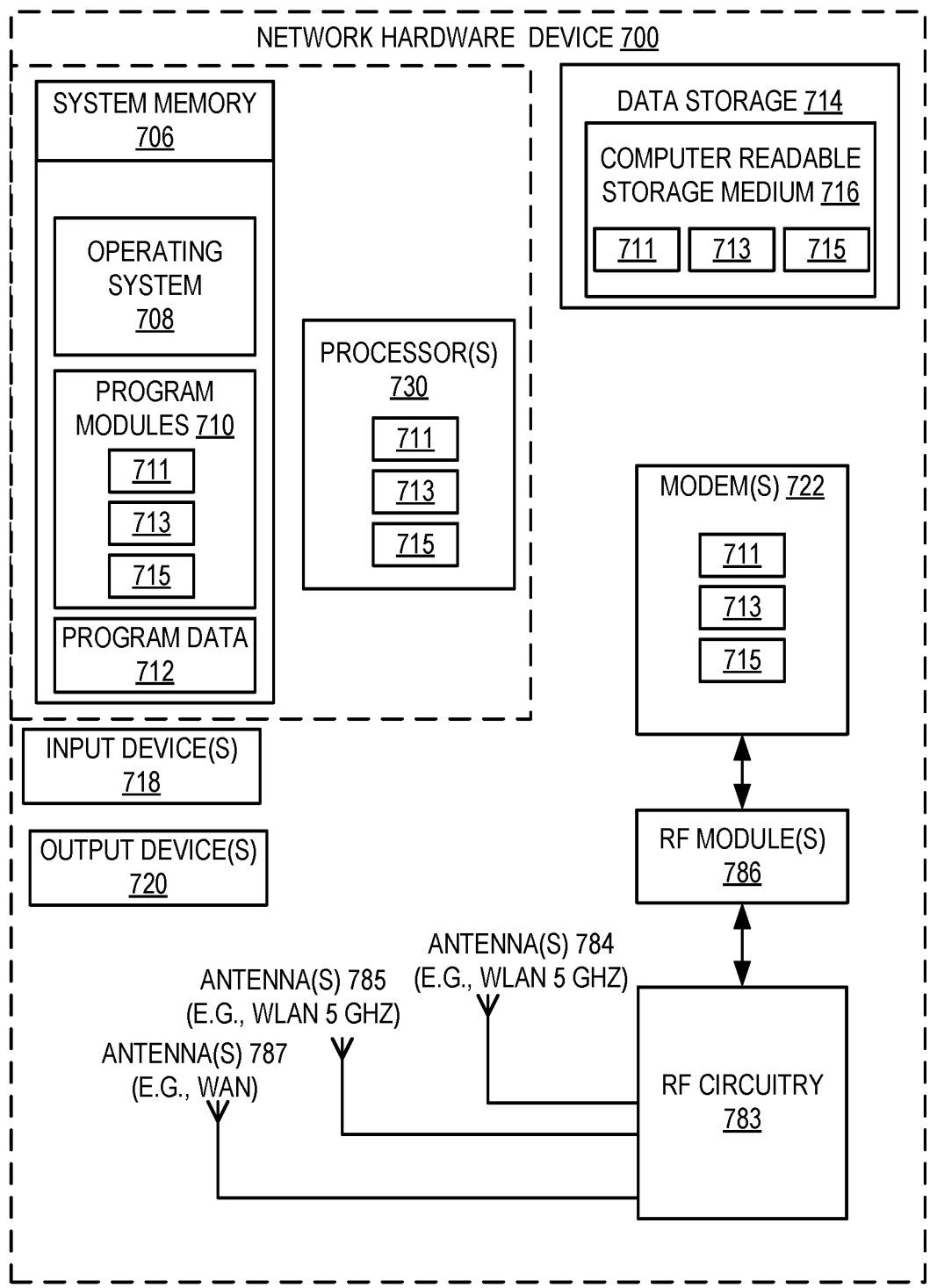
FIG. 7 is a block diagram of a network hardware device according to one embodiment.

FIG. 7 is a block diagram of a network hardware device 700 according to one embodiment. The network hardware device 700 may correspond to the wireless network devices described above with respect to FIGS. 1-6. Alternatively, the network hardware device 700 may be other electronic devices, as described herein.

The network hardware device 700 includes one or more processor(s) 730, such as one or more CPUs, microcontrollers, field programmable gate arrays, or other types of processors. The network hardware device 700 also includes system memory 706, which may correspond to any combination of volatile and/or non-volatile storage mechanisms. The system memory 706 stores information that provides operating system component 708, various program modules 710, program data 712, and/or other components. In one embodiment, the system memory 706 stores instructions of methods to control operation of the network hardware device 700. The network hardware device 700 performs functions by using the processor(s) 730 to execute instructions provided by the system memory 706. In one embodiment, the program modules 710 may include dual-mode frame processing logic 711, AP processing logic 713, and mesh processing logic 715. The dual-mode frame processing logic 711 may perform some of the operations of the method 500 of FIG. 5. The AP processing logic 713 can process frames directed to the AP and the mesh processing logic 715 can process frames directed to the mesh station. Alternatively, the dual-mode frame processing logic 711, the AP processing logic 713, the mesh processing logic 715 may be implemented in a single module or multiple modules.

The network hardware device 700 also includes a data storage device 714 that may be composed of one or more types of removable storage and/or one or more types of non-removable storage. The data storage device 714 includes a computer-readable storage medium 716 on which is stored one or more sets of instructions embodying any of the methodologies or functions described herein. Instructions for the program modules 710 (e.g., 711, 713, 715) may reside, completely or at least partially, within the computer-readable storage medium 716, system memory 706 and/or within the processor(s) 730 during execution thereof by the network hardware device 700, the system memory 706 and the processor(s) 730 also constituting computer-readable media. The network hardware device 700 may also include one or more input devices 718 (keyboard, mouse device, specialized selection keys, etc.) and one or more output devices 720 (displays, printers, audio output mechanisms, etc.).

The network hardware device 700 further includes a modem 722 to allow the network hardware device 700 to communicate via a wireless connections (e.g., such as provided by the wireless communication system) with other computing devices, such as remote computers, an item providing system, and so forth. The modem 722 can be connected to one or more radio frequency (RF) modules 786. The RF modules 786 may be a WLAN module, a WAN module, PAN module, global positioning system (GPS) module, or the like. The antenna structures (antenna(s) 784, 785, 787) are coupled to the RF circuitry 783, which is coupled to the modem 722. The RF circuitry 783 may include radio front-end circuitry, antenna switching circuitry, impedance matching circuitry, or the like. The antennas 784 may be GPS antennas, near field communication (NFC) antennas, other WAN antennas, WLAN or PAN antennas, or the like. The modem 722 allows the network hardware device 700 to handle both voice and non-voice communications (such as communications for text messages, multimedia messages, media downloads, web browsing, etc.) with a wireless communication system. The modem 722 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 722 may generate signals and send these signals to antenna(s) 784 of a first type (e.g., WLAN 5 GHz), antenna(s) 785 of a second type (e.g., WLAN 2.4 GHz), and/or antenna(s) 787 of a third type (e.g., WAN), via RF circuitry 783, and RF module(s) 786 as descried herein. Antennas 784, 785, 787 may be configured to transmit in different frequency bands and/or using different wireless communication protocols. The antennas 784, 785, 787 may be directional, omnidirectional, or non-directional antennas. In addition to sending data, antennas 784, 785, 787 may also receive data, which is sent to appropriate RF modules connected to the antennas. One of the antennas 784, 785, 787 may be any combination of the antenna structures described herein.

In one embodiment, the network hardware device 700 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of the WMN and the second wireless connection may be associated with serving a content file to a client consumption device, as described herein.

Though a modem 722 is shown to control transmission and reception via antenna (784, 785, 787), the network hardware device 700 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A wireless network device comprising:
a single wireless local area network (WLAN) radio; and
an application processor coupled to the single WLAN radio, wherein the application processor comprises dual-mode frame processing logic, access point (AP) data path logic, AP control path logic, mesh data path logic, and mesh control path logic, wherein the dual-mode frame processing logic:
in a first mode, broadcasts, via the single WLAN radio, a first beacon, wherein the first beacon comprises i) a mesh identifier (mesh ID) that identifies the wireless network device as a mesh station that is part of a wireless mesh network and ii) a mesh configuration element, wherein the wireless network device operates as the mesh station in the first mode;
receives control information that causes the wireless network device to change from the first mode to a second mode, wherein the wireless network device concurrently operates as both the mesh station that is part of the wireless mesh network and an AP of an access network in the second mode;
in the second mode, broadcasts, via the single WLAN radio, the first beacon and a second beacon, wherein the second beacon comprises a service set identifier (SSID) of the access network; and
in the second mode,
receives, via the single WLAN radio, a first management frame from a second wireless network device,
determines that the first management frame comprises the mesh ID,
sends the first management frame to the mesh control path logic,
receives, via the single WLAN radio, a second management frame from a wireless client device,
determine that the second management frame does not include a mesh ID, and
sends the second management frame to the AP control path logic.

2. The wireless network device of claim 1, wherein the dual-mode frame processing logic further:
in the second mode,
receives, via the single WLAN radio, a third data frame from the wireless client device,
determines that the third data frame comprises a first bit that is not set in a first subfield of a frame control field and a second bit that is set in a second subfield of the frame control field, wherein the first bit not being set and the second bit being set indicate that the first third data frame is directed to the AP, and
sends the third data frame to the AP data path logic.

3. The wireless network device of claim 1, wherein the dual-mode frame processing logic further:
in the second mode,
receives a fourth data frame via the single WLAN radio,
determines that the fourth data frame comprises a first bit that is set in a first subfield of a frame control field, wherein the first bit being set indicates that the fourth data frame is directed to the mesh station; and
sends the fourth data frame to the mesh data path logic.

4. An electronic device comprising:
a radio; and
a processor coupled to the radio, the processor comprising a first processing logic and a second processing logic, wherein the electronic device operates in a first mode and a second mode, and wherein the processor is to:
send, in the first mode via the radio, first data that identifies the electronic device as a mesh station that is part of a wireless mesh network;
send, in the second mode via the radio, second data that identifies the electronic device as concurrently being the mesh station that is part of the wireless mesh network and an access point (AP) that is part of an access network;
receive, in the second mode, a first frame via the radio;
process the first frame using the first processing logic;
receive, in the second mode, a second frame via the radio; and
process the second frame using the second processing logic.

5. The electronic device of claim 4, wherein the second data comprises a first beacon comprising a mesh identifier (mesh ID) of the mesh station and wherein the second data further comprises a second beacon comprising a service set identifier (SSID) of the access network.

6. The electronic device of claim 4, wherein the second data comprises a single beacon comprising a mesh identifier (mesh ID) of the mesh station and a service set identifier (SSID) of the access network.

7. The electronic device of claim 4, wherein the first processing logic comprises mesh control path logic and mesh data path logic, wherein the processor is further to determine that the first frame is a data frame directed to the mesh station and send the data frame to the mesh data path logic.

8. The electronic device of claim 4, wherein the first processing logic comprises mesh control path logic and mesh data path logic, wherein the processor is further to determine that the first frame is a management frame directed to the mesh station and send the management frame to the mesh control path logic.

9. The electronic device of claim 4, wherein the second processing logic comprises AP control path logic and AP data path logic, wherein the processor is further to determine that the second frame is a data frame directed to the AP and send the data frame to the AP data path logic.

10. The electronic device of claim 4, wherein the second processing logic comprises AP control path logic and AP data path logic, wherein the processor is further to determine that the second frame is a management frame directed to the AP and send the management frame to the AP control path logic.

11. The electronic device of claim 4, wherein the processor is further to:
determine a frame type of the first frame, wherein the frame type is at least one of a data frame, a control frame, or a management frame;

determine that the first frame is the management frame and that the management frame comprises a mesh identifier associated with the mesh station; or
  determine that the first frame is data frame and the data frame comprises information that indicates that the data frame originated from another mesh station that is part of the wireless mesh network.

12. The electronic device of claim 4, wherein the processor, to determine that the first frame is directed to the mesh station, is to:
  determine a frame type of the first frame, wherein the frame type is at least one of a data frame, a control frame, or a management frame;
  determine that the first frame is the management frame and that the management frame is a mesh-specific management frame; or
  determine that the first frame is data frame and the data frame comprises information that indicates that the data frame originated from another mesh station that is part of the wireless mesh network.

13. The electronic device of claim 4, wherein the processor, to determine that the second frame is directed to the AP, is to:
  determine a frame type of the first frame, wherein the frame type is at least one of a data frame, a control frame, or a management frame;
  determine that the second frame is the management frame and that the management frame does not comprise a mesh identifier; or
  determine that the second frame is data frame and the data frame comprises information that indicates that the data frame originated from a client that is part of the access network.

14. The electronic device of claim 4, wherein the processor is further to:
  create a first virtual network interface for the first processing logic and a second virtual network interface, wherein the second virtual network interface is coupled to the second processing logic;
  determine that the first frame is not addressed to the electronic device;
  send the first frame to the second virtual network interface;
  determine that the second frame is addressed to a remote server; and
  send the second frame to the first virtual network interface.

15. A method comprising:
  sending, via a radio of an electronic device in a first mode, first data that identifies the electronic device as a mesh station that is part of a wireless mesh network;
  sending, via the radio of the electronic device in a second mode, second data that identifies the electronic device as concurrently being the mesh station that is part of the wireless mesh network and an access point (AP) that is part of an access network;
  receiving, via the radio in the second mode, a first frame from a second device;
  determining, by a processor of the electronic device, that the first frame is directed to the mesh station;
  processing, by a first protocol stack of the processor, the first frame;
  receiving, via the radio in the second mode, a second frame from a third device;
  determining, by the processor, that the second frame is directed to the AP; and
  processing, by a second protocol stack of the processor, the second frame.

16. The method of claim 15, wherein the sending the second data comprises:
  sending a first beacon, wherein the first beacon comprises a mesh identifier (mesh ID) of the mesh station that is part of the wireless mesh network; and
  sending a second beacon, wherein the second beacon comprises a service set identifier (SSID) of the access network.

17. The method of claim 16, further comprising:
  determining a frame type of the first frame, wherein the frame type is at least one of a data frame, a control frame, or a management frame;
  determining that the first frame is at least one of a mesh frame type or comprises a mesh identifier; and
  determining that the second frame comprises information that indicates that the second frame originates from another mesh station that is part of the access network.

18. The method of claim 16, further comprising:
  determining a frame type of the second frame, wherein the frame type is at least one of a data frame, a control frame, or a management frame;
  determining that the second frame does not comprise a mesh identifier; and
  determining that the second frame comprises information that indicates that the second frame originates from a wireless client device that is part of the access network.

19. The method of claim 16, further comprising:
  generating, by the processor, a mesh management frame;
  inserting, by the processor, a mesh identifier (mesh ID) element into the mesh management frame; and
  sending, by the processor via the radio, the mesh management frame to a fourth device.

20. The method of claim 15, wherein the sending the second data comprises sending a single beacon, wherein the single beacon comprises a mesh identifier (mesh ID) of the mesh station and a service set identifier (SSID) of the access network.

* * * * *